US005806237A

United States Patent [19]
Nelson et al.

[11] Patent Number: 5,806,237
[45] Date of Patent: Sep. 15, 1998

[54] RODENT BAIT STATION

[75] Inventors: Thomas Dean Nelson, Maplewood; Douglas Grinnell Anderson, Lakeville; James Brian Easley, Orono; Kenneth Vern Schomburg, Wayzata; Robert Lee Dietz, Northfield; Terry Leland Elichuk, Eden Prairie; Daniel Leroy Lobstein, Prior Lake; Clarence William Snedeker, Woodbury, all of Minn.

[73] Assignee: Ecolab Inc., St. Paul, Minn.

[21] Appl. No.: 713,558

[22] Filed: Sep. 11, 1996

[51] Int. Cl.$^6$ ..................................................... A01M 1/20
[52] U.S. Cl. .................................................................. 43/131
[58] Field of Search ....................................... 43/131, 124

[56] References Cited

U.S. PATENT DOCUMENTS 4,793,093  12/1988  Gentile ........................................ 43/131
4,837,969   6/1989  Demarest .................................... 43/131
5,448,852   9/1995  Spragin et al. ............................ 43/131

FOREIGN PATENT DOCUMENTS 2 203 987   1/1980   United Kingdom .

Primary Examiner—J. Woodrow Eldred
Attorney, Agent, or Firm—Merchant, Gould, Smith, Edell, Welter & Schmidt, P.A.

[57] ABSTRACT

A rodent bait station includes an enclosure having an inclined passageway leading from an opening in the enclosure to an elevated bait receptacle having a removable tray with a handle. The inclined passageway terminates at the lowest elevation of the opening to prevent water from becoming trapped in the enclosure. A separate internal receptacle is provided in the enclosure for storing and protecting printed materials, e.g., maintenance records. A replaceable latch on the enclosure includes an alignment member disposed between a pair of engagement members which engage cooperative slots and which are deformable to unengaged positions by a key that wedges between the engagement members and the alignment member.

23 Claims, 6 Drawing Sheets

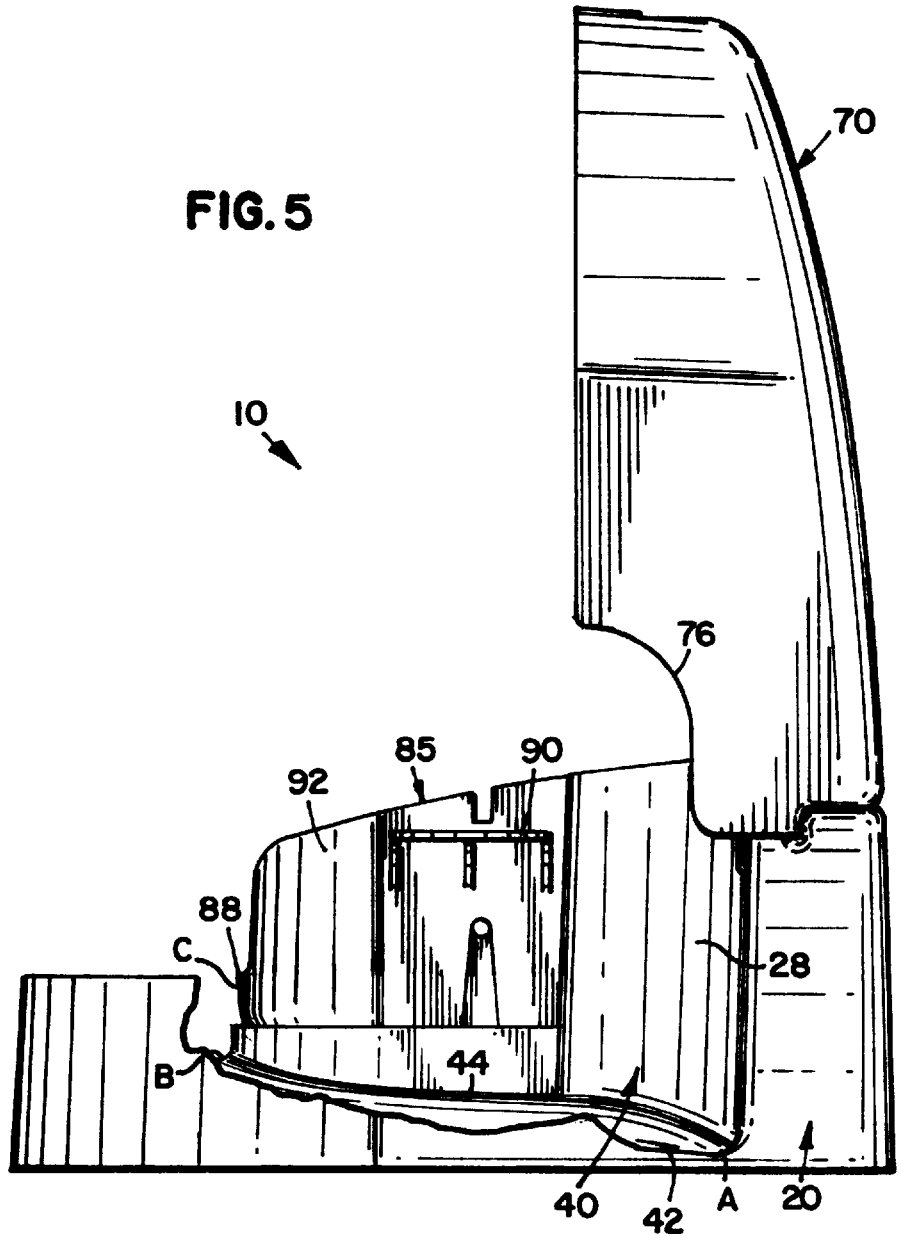

RODENT BAIT STATION

CROSS REFERENCE TO RELATED APPLICATIONS

This application is related to U.S. Design application Ser. No. 29/059,472, filed on an even date herewith by Michael D. Prince et al. and entitled "Rodent Bait Station", now Pat. No. D389611 the subject matter of which is incorporated by reference herein.

FIELD OF THE INVENTION

The present invention is generally directed to pest elimination, and in particular, to a tamper-resistant rodent bait station for dispensing bait.

BACKGROUND OF THE INVENTION

Rodent bait stations are used in the pest elimination industry to dispense rodenticide "bait" to rodents. Since rodenticides may be dangerous to non-target animals as well as humans, a continuing need has existed for a tamper-resistant rodent bait station that only permits rodents to access the bait, while preventing others, especially children and pets, from doing so. While being tamper-resistant, however, a rodent bait station must also not deter rodents from entering the station. Making a rodent bait station simultaneously tamper-resistant and attractive to rodents has proven to be difficult to achieve.

Several conventional rodent bait stations utilize closed containers having one or more internal passageways leading to a bait receptacle. The passageways may be angled to make it difficult for a child or pet to reach the bait through the opening. Additional visible egresses may also be oriented in a bait station so that rodents do not feel "trapped" in the station. Moreover, as rodents typically use their whiskers to feel their way through passageways, angled walls may be oriented within the passageways to "lead" the rodents to the bait receptacle.

Many rodent bait stations utilize passageways having straight walls joined at corners. However, rodents may be deterred from proceeding through a passageway as a result of sharp delineations between walls, thereby reducing the attractiveness to rodents.

Another concern for rodent bait stations is that of protecting the bait from the environment, since stations may be used outdoors, in basements and other damp areas where rodents frequent. Contamination from water, for example, may cause spoilage or dispersal of the bait. Conventional rodent bait stations attempt to address this problem by placing lips at openings or elevating openings relative to the bottom of a station. However, it has been found that if enough water is present to enter a conventional rodent bait station, the lip or elevated opening often traps the water in the station, whereby rodents may be deterred from entering the station.

Maintaining rodent bait stations also raises several concerns. For example, a given installation may have numerous stations dispersed throughout an area which require periodic service such as for removing old stale bait and adding fresh bait. Accordingly, it is desirable for a rodent bait station to be opened easily and quickly by authorized personnel, while still preventing others from opening the station. Several latch designs have been developed to restrict access to the stations, e.g., using bolts or ties. However, many of the designs are cumbersome and time consuming to operate.

Other latches may rely on catches on a lid which engage ledges in a base; however, the latch components are typically integrally formed with the base and/or lid, whereby breakage of the latch requires replacement of the entire station. Moreover, some bait stations rely on living hinges to secure lids to bases, many of which have the tendency to break after a period of use.

In addition, cleaning out old bait may be problematic as an entire rodent bait station may need to be washed out when serviced. Some conventional designs utilize flimsy, disposable feed trays which are thrown out and replaced; however, this practice may be too costly and wasteful for some applications.

Keeping records of station maintenance is also a problem with conventional stations since records are typically kept on labels affixed to the interiors or exteriors of the stations. The labels are difficult to write on, and may fall off or become unreadable due to weathering. Moreover, if labels are accessible to rodents, the rodents may chew on, defecate on or otherwise soil the labels, raising sanitary and disease concerns for maintenance personnel, as well as possibly making the labels unreadable.

Therefore, a substantial need has continued to exist for a tamper-resistant, weather-resistant, effective, durable and easily maintained rodent bait station.

SUMMARY OF THE INVENTION

The present invention addresses these and other concerns associated with the prior art in providing in one aspect a rodent bait station which utilizes an enclosure having an inclined passageway leading from an opening in the enclosure to a bait receptacle to enable any water that accumulates in the rodent bait station to drain out of the enclosure. The present invention addresses additional concerns in providing in another aspect a rodent bait station having an isolated receptacle located in the station for storing and protecting printed materials, e.g., maintenance records. In addition, the present invention addresses other concerns in providing in a further aspect a rodent bait station having a secure yet easy opening latch with one or more engagement members which engage cooperative slots and which are displaceable from engaged to unengaged positions by a unique key that wedges between the engagement members and a separate alignment member.

Several other advantages are attained by preferred embodiments of the invention. For example, the bait receptacle may include a removable tray with a handle for easier removal and cleaning. Wall surfaces defining the internal passageway may be formed from a contiguous curve, and a curved return may be disposed proximate the entrance of the bait receptacle, to encourage rodents to enter the bait receptacle. The inclined passageway may also terminate at the lowest elevation of the opening to prevent water from becoming trapped in the enclosure. In addition, a latch may be replaceable such that breakage of the latch does not require the entire station to be replaced.

Therefore, in accordance with one aspect of the invention, there is provided a rodent bait station which includes an enclosure having at least one opening defined in an exterior wall thereof; a bait receptacle disposed within the enclosure and defined by at least one interior wall of the enclosure, the bait receptacle having a support surface that supports bait; and an inclined passageway defined by a ramp and at least one wall of the enclosure.

In accordance with another aspect of the invention, there is provided a rodent bait station which includes an enclosure; a bait receptacle disposed within a rodent accessible area of the enclosure for housing bait; and an interior receptacle disposed within the enclosure and isolated from the rodent accessible area of the enclosure.

According to a further aspect of the invention, there is provided a rodent bait station which includes a base; a lid; and a latch for securing the lid to the base. The latch includes an alignment member and a engagement member secured to one of the lid and the base, the engagement member including a catch, wherein the other of the lid and the base includes first and second apertures which respectively receive the alignment and engagement members of the latch, wherein the catch faces the alignment member, wherein the engagement member is deformable from an engaged position to an unengaged position, wherein in the engaged position, the catch on the engagement member restricts movement of the engagement member through the second aperture, and in the unengaged position, the catch on the engagement member permits movement of the engagement member through the second aperture.

These and other advantages and features, which characterize the invention, are set forth in the claims annexed hereto and forming a further part hereof. However, for a better understanding of the invention, and of the advantages and objectives obtained by its use, reference should be made to the Drawing, and to the accompanying descriptive matter, in which there is described preferred embodiments of the invention.

BRIEF DESCRIPTION OF THE DRAWING

FIG. 5 is a right side elevational view of the rodent bait station of FIG. 1, shown with the lid in an open orientation and with portions of the exterior wall cut away;

DETAILED DESCRIPTION OF THE PREFERRED EMBODIMENTS

Figure 1:
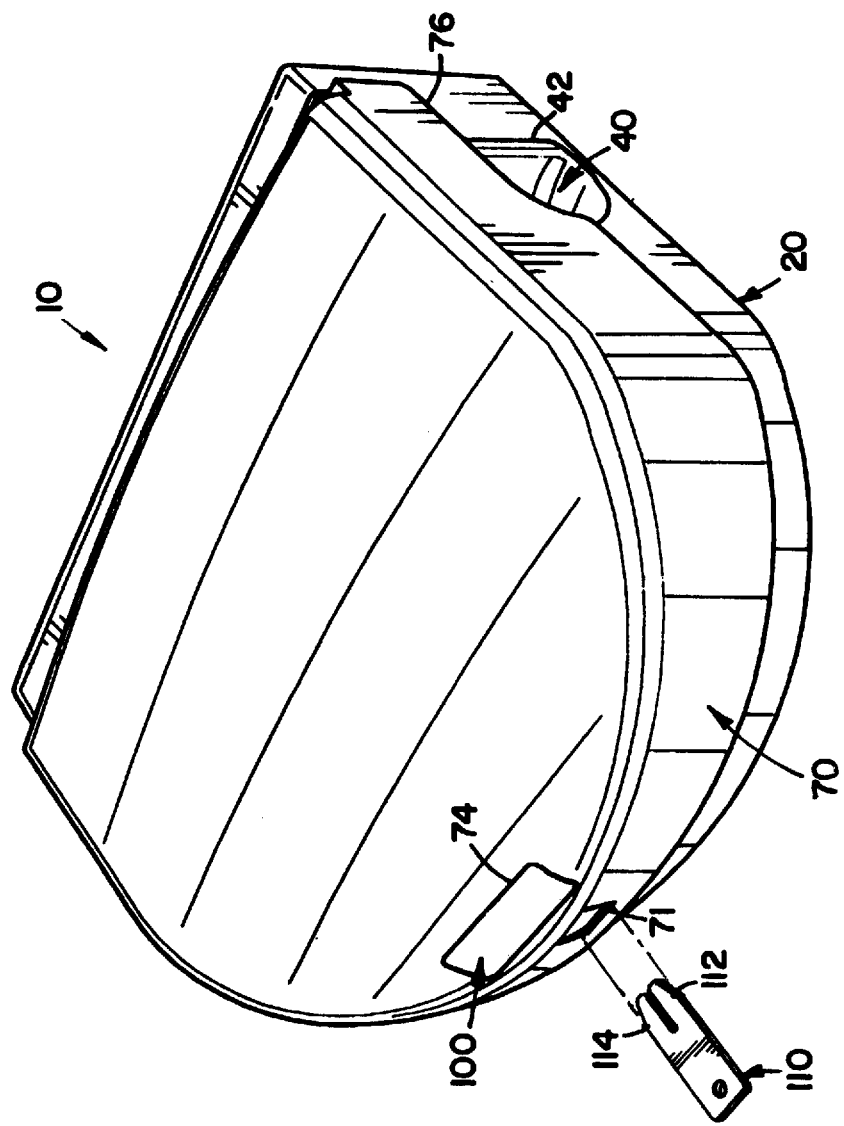
FIG. 1 is a top, right, front perspective view of a preferred rodent bait station consistent with the principles of the present invention, with a key shown for opening the rodent bait station.

Turning to the Drawing, wherein like numbers denote like parts throughout the several views, FIG. 1 illustrates a preferred rodent bait station 10 consistent with the principles of the present invention. Station 10 includes an enclosure formed by a base 20 and lid 70 secured together by a latch 100. Latch 100 is actuated with a key 110 received in key aperture 71 of lid 70.

Figure 2:
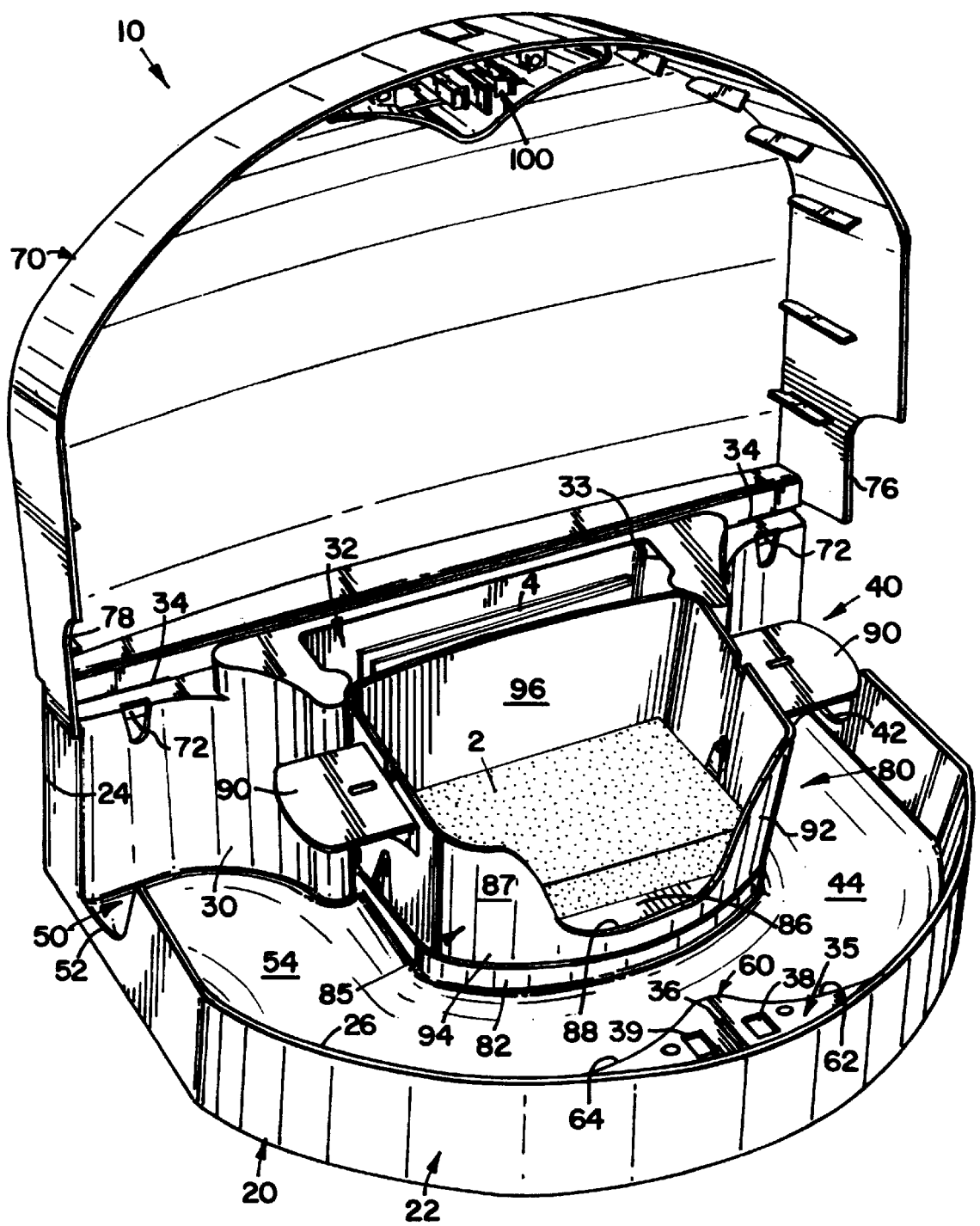
FIG. 2 is a top, left, front perspective view of the rodent bait station of FIG. 1, shown with the lid in an open orientation.
Figure 3:
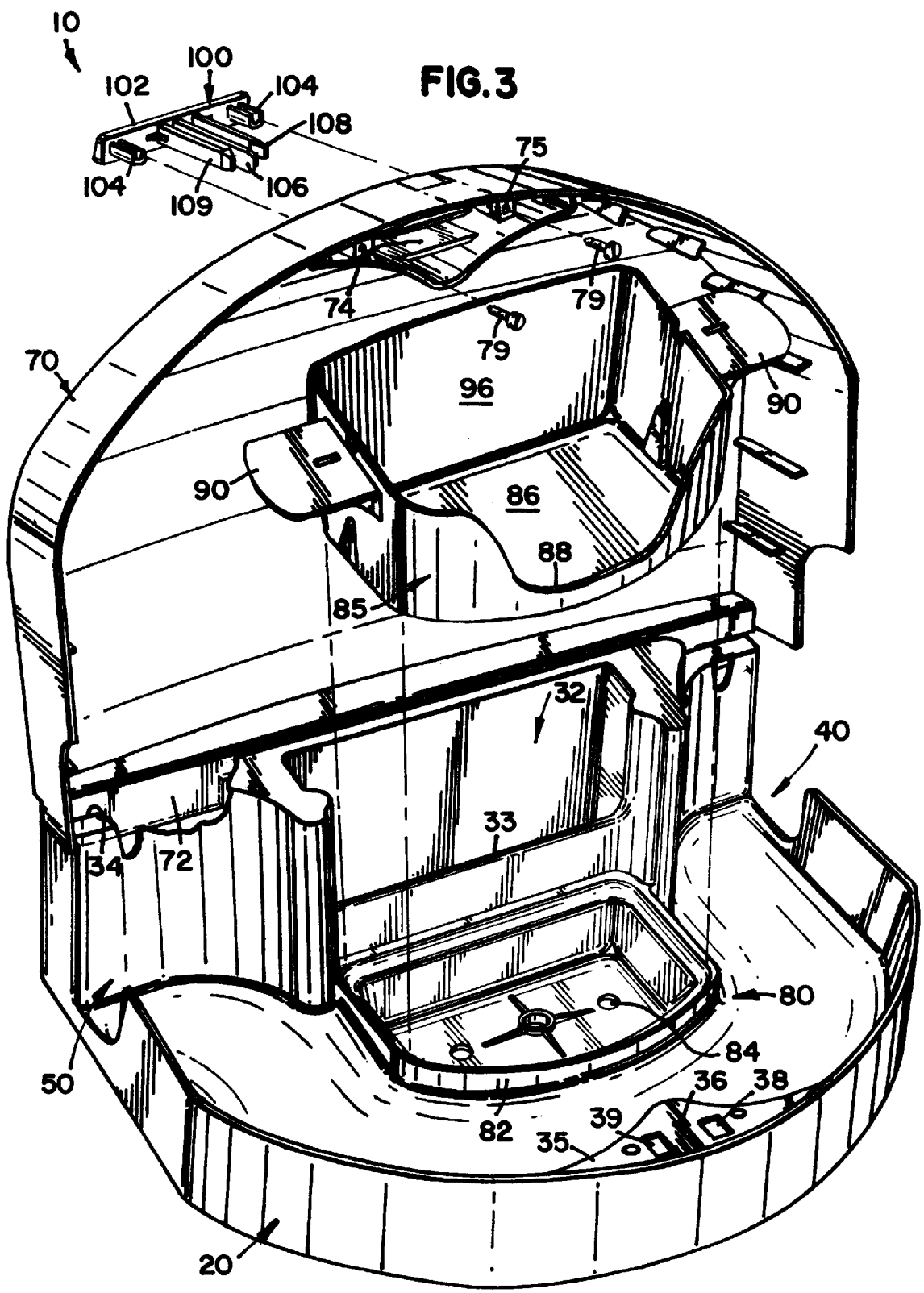
FIG. 3 is a partially-exploded top, left, front perspective view of the rodent bait station of FIG. 1, with portions of the base cut away to illustrate the tabs on the lid engaging slots in the base.
Figure 4:
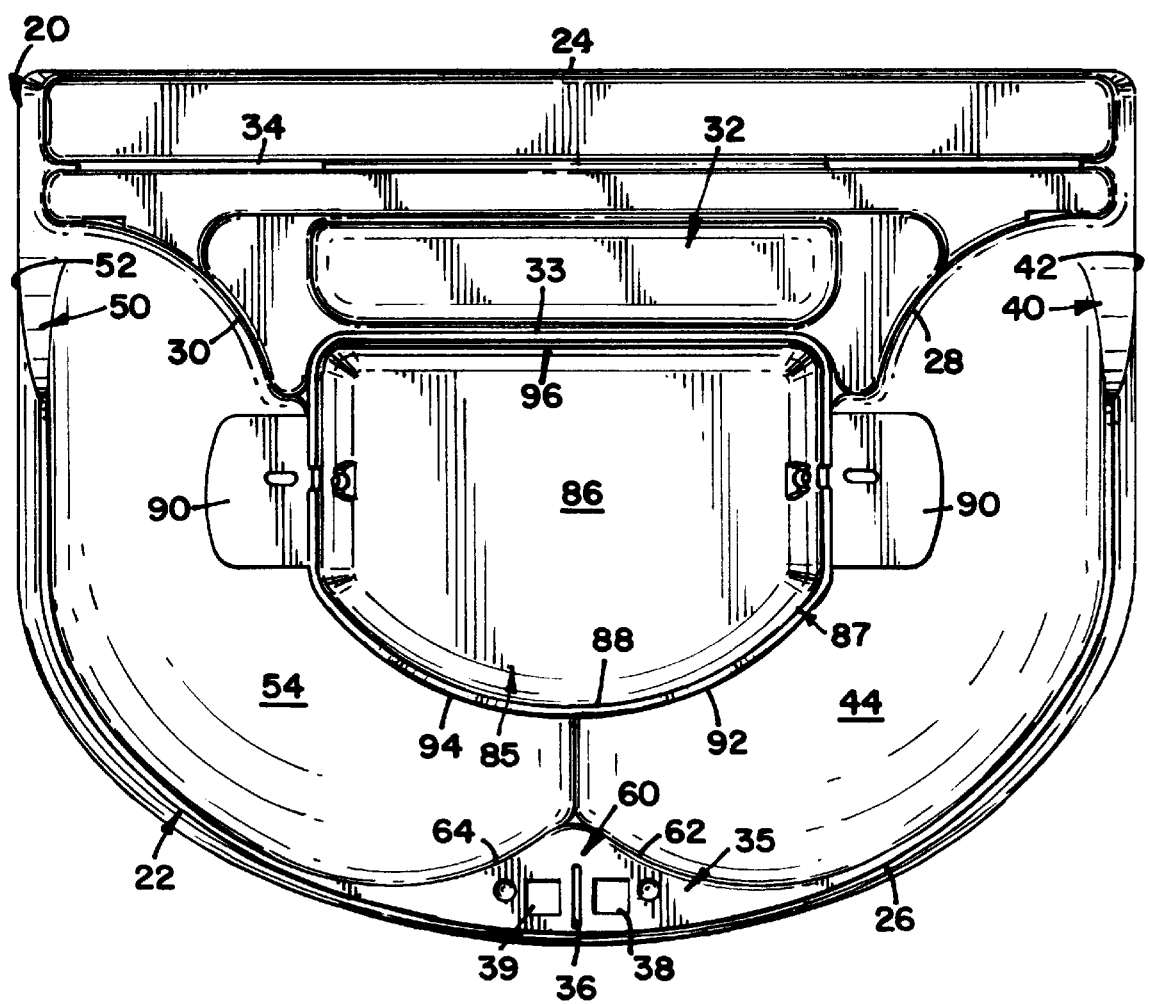
FIG. 4 is a top plan view of the base of the rodent bait station of FIG. 1.

Rodent bait station 10 is shown in greater detail in FIGS. 1–5. As best shown in FIG. 4, base 20 is preferably an integral injection molded plastic member, preferably formed of polypropylene or another suitably strong and durable material. Base 20 includes an exterior wall 22 which preferably defines a "D" shape, having a straight portion 24 and a curved portion 26. A pair of openings 42, 52 separate portions 24 and 26. While other basic shapes for station 10 may be used in the alternative, it has been found that the "D" shape is useful in orienting openings 42 and 52 proximate a building wall (with straight portion 24 facing the wall) as well as in a corner (with curved portion 26 facing the corner), since it has been found that rodents tend to move along walls while feeling the walls with their whiskers.

A pair of inclined passageways 40, 50 lead from openings 42, 52 to a bait receptacle 80. As shown in FIGS. 2–4, bait receptacle 80 preferably includes a removable tray 85 housing bait 2 and supported in a depressed pan or plinth 82 formed in base 20. In the preferred embodiment, tray 85 provides a support surface 86 for supporting the bait; however, it should be appreciated that a support surface may instead be defined on a permanent structure in bait receptacle 80. In general, any compartment or partially enclosed area housing a bait may be used as a bait receptacle.

As shown in FIG. 5, pan 82 preferably supports tray 85 (and consequently, the support surface) at an elevated orientation relative to openings 42, 52. As shown in FIG. 3, drain holes 84 are preferably provided in pan 82 to permit any water that does accumulate in the pan to drain out of station 10. In the alternative, the support surface may be at the same level as the openings; however, spoilage from exposure to moisture may be more likely.

Tray 85 is preferably an injection molded cup formed of polypropylene and having one or more integrally formed handles 90. Handles 90 are preferably formed along an upper portion of tray 85 such that they are easily accessible and minimize operator contact with bait housed in the tray.

As shown in FIGS. 2–4, tray 85 includes a support surface 86 sized and shaped to fit within pan 82. An opening or entrance 88 is formed in a sidewall 87 of tray 85 proximate the intersection of passageways 40, 50 to permit rodents to access the bait. Entrance 88 defines a lip in the sidewall which is elevated relative to passageways 40, 50 to restrict the flow of water into tray 85. Preferably, entrance 88 of tray 85 (shown at elevation "C") is elevated above the bottom elevations of the openings (shown at elevation "A") to lessen the likelihood of water entering the tray through the openings.

First inclined passageway 40 is defined by an inclined ramp 44, exterior wall 22, and an interior wall 28 of base 20, as well as sidewall 92 of tray 85. Similarly, second inclined passageway 50 is defined by an inclined ramp 54, exterior wall 22, and an interior wall 30 of base 20, as well as sidewall 94 of tray 85. In addition, a return 60, including a pair of walls 62, 64, is provided in base 20 to lead rodents toward entrance 88 of bait receptacle 80. Ramps 44, 54 preferably meet proximate entrance 88 of tray 85, with an elevation "B" (FIG. 5) above the bottom elevation of openings 42, 52 (elevation "A"). Moreover, as shown in FIG. 5, the passageways are steeper proximate the openings, which facilitates drainage. The more gradual incline proximate entrance 88 is more attractive to rodents while eating.

Ramps 44, 54 are preferably formed in base 20. In the alternative, the ramps may be integrally formed with tray 85 and thus may be removable from the base.

As shown in FIG. 4, the portions of exterior wall 22, interior walls 28, 30, sidewalls 92, 94 and return walls 62, 64 which define passageways 40 and 50 are preferably curved such that discontinuities in the rodent-accessible surfaces of the passageways are minimized. It is believed that the smooth surfaces present a more gradual profile which is more attractive to rodents than straight walls that are clearly delineated along corners and edges. However, it should be appreciated that any surface profiles may be used consistent with the invention.

In addition, ramps 44, 54 preferably terminate at the bottom elevations of openings 42, 52 such that no lip is formed at the openings. This configuration prevents water and moisture from collecting in the passages. While lips may be formed in the alternative, it is believed that collected moisture in the passageways may deter rodents from entering the station.

As shown in FIGS. 2–4, an additional internal receptacle 32 is also preferably provided in base 20. Receptacle 32 is particularly useful for storing maintenance records or other printed materials (illustrated at 4) which may be removed, written upon, and returned during maintenance of station 10. Other materials, such as warnings, etc. may also be stored in receptacle 32 as desired.

Receptacle 32 is preferably isolated (e.g., by lid 70 and rear wall 96 of tray 85) from any rodent accessible areas (e.g., passageways 40, 50 and bait receptacle 80) to prevent rodents from gnawing on any printed materials, as well as to prevent moisture from entering the receptacle. Consequently, the lip 33 formed around receptacle 32 is preferably elevated with respect to pan 82 and ramps 44, 54. As shown in FIG. 3, in the preferred embodiment, the portion of lip 33 proximate tray 85 is cut out to facilitate removal of materials stored in the receptacle, although this portion of the lip is still above the pan and ramps. Receptacle 32 may be accessed in the alternative by a separate access door or other closure that restricts access by rodents when in use.

As is also shown in FIG. 3, lid 70 engages base 20 using a pair of tabs 72 that engage slots 34 in base 20. Lid 70 is thus pivotal as well as removable from base 20. Lid 70 also includes portions 76, 78 which extend around and partially define openings 42, 52.

A latch 100 is secured within a port 74 in lid 70 to lock lid 70 onto base 20 and thereby restrict access to receptacles 80, 32 of base 20. Latch 100 is secured to lid 70 through a pair of screws 79 engaging mounting brackets 75 on lid 70. In the alternative, latch 100 may be secured to base 20 for latching with lid 70, or the latch may be integrally formed in either the lid or the base.

Figure 6A:
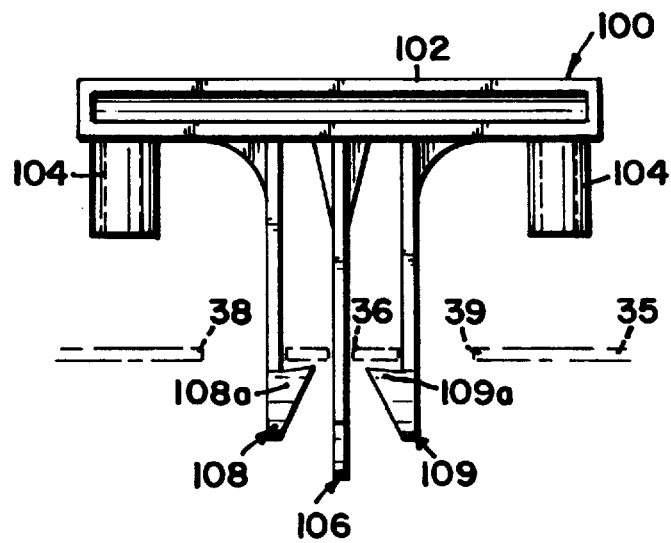
FIG. 6A is a rear elevational view of the latch of the rodent bait station of FIG. 1, with the apertures in the base shown in phantom, and with the latch in an engaged position.
Figure 6B:
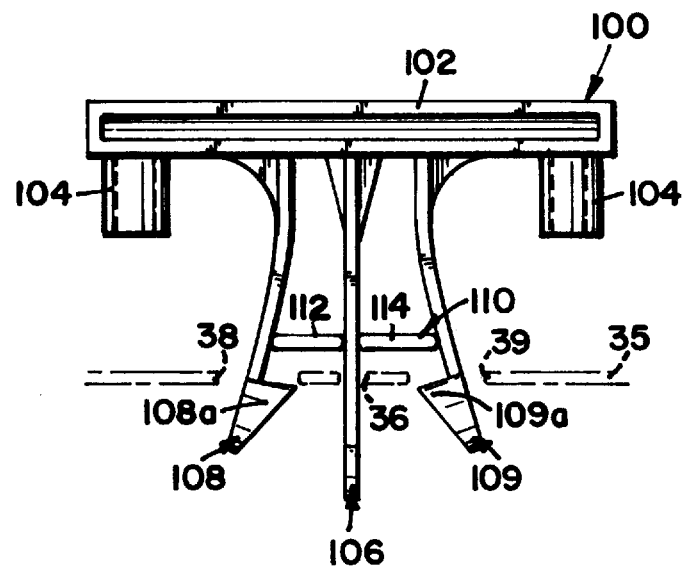
FIG. 6B is a rear elevational view of the latch of the rodent bait station of FIG. 1, with the apertures in the base shown in phantom, and with the latch deformed to an unengaged position by the key.

Latch 100 is shown in greater detail in FIGS. 6A and 6B. Latch 100 is preferably an injection molded member formed from nylon or another suitably resilient and durable material. A pair of mounting posts 104 extend from a base member 102 for mounting the latch to lid 70. An alignment member 106 and a pair of engagement members 108, 109 also extend from base member 102. Engagement members 108, 109 each include a catch 108a, 109a which faces alignment member 106 and which engages base 20 to secure lid 70 thereto. Moreover, engagement member 108 and 109 are normally biased to engaged positions as shown in FIG. 6A, but are deformable, in directions away from alignment member 106, to unengaged positions (i.e., the positions shown in FIG. 6B).

As shown in FIGS. 2–4 and 6A–6B, base 20 includes three apertures 36, 38 and 39 disposed on a surface 35 of return 60. Apertures 36, 38, 39 are each positioned relative to latch 100 to receive alignment member 106, first engagement member 108 and second engagement member 109, respectively. Aperture 36 preferably has a profile which matches the cross-sectional profile of alignment member 106 such that the latch self-aligns the lid with the base. Apertures 38 and 39 are sized and positioned relative to aperture 36 such that inclined surfaces on catches 108a, 109a urge engagement members 108, 109 to unengaged positions when lid 70 is being pivoted closed. Then, once catches 108a, 109a pass surface 35, engagement members 108, 109 snap back into engaged positions with catches 108a, 109a securing latch 100, and consequently lid 70, to base 20.

Latch 100 is preferably opened by a key 110 shown in FIGS. 1 and 6B. Key 110 may be formed of nylon or another plastic, or may be formed of metal or another rigid material. Key 110 generally includes a pair of wedge members or fingers 112, 114 which, when key 110 is inserted into key aperture 71 of lid 70, wedge respectively between engagement member 108 and alignment member 106, and between engagement member 109 and alignment member 106. As shown in FIG. 6B, insertion of key 110 deforms engagement members 108, 109 to unengaged positions such that catches 108a, 109a are permitted to pass through apertures 38, 39 and thereby permit lid 70 to be opened.

It should be appreciated that other arrangements whereby one or more engagement members are deformable relative to one or more alignment members may be used in the alternative. In particular, only one engagement member and one alignment member may be used. In addition, it should be appreciated that other locations for latch 100, as well as additional latches, may also be used. Moreover, latch 100 may be secured to a base, with apertures instead located in a lid. Other latching arrangements will be appreciated by one skilled in the art.

In operation, rodent bait station 10 is typically placed in locations where rodents are known to frequent, indoors or outdoors, and typically with openings 42, 52 disposed proximate a wall or corner. Bait, e.g., Ecolab Rat and Mouse Exterminator available from Ecolab, Inc., is placed in station 10 by opening latch 100 with key 110, opening lid 70, placing the bait in removable tray 85, and closing lid 70 to lock latch 100. Any rodents which enter an opening 42, 52 are guided to entrance 88 of tray 85 by the curved inclined passageways 40, 50 and return 60, where they consume the slow acting bait. The presence of an egress for the rodent through the opposite opening, as well as the lack of standing water retained by a lip at the openings, is believed to increase the likelihood of rodents entering the station and consuming bait.

As discussed above, the elevated position of tray 85, as well as the profile of the tray walls, lessen the possibility of moisture entering the station and contaminating the bait. Moreover, any moisture that does enter the station exits either through openings 42, 52 or through drain apertures 84 in bait receptacle 80.

Periodic maintenance of station 10 may be required. After opening latch 100 with key 110 and lifting lid 70, tray 85 may be removed and cleaned without cleaning the entire station 10, and new bait may be placed in the tray, before closing lid 70 to secure latch 100. In addition, with lid 70 open, the maintenance records may be removed from receptacle 34, e.g., so an operator can indicate the current date as when the station was last serviced. Other maintenance, such as replacing a broken latch 100 or lid 70 may also be performed at this time. It should be noted that failure of latch 100 (e.g., should any of members 106, 108 or 109 break) or failure of lid 70 (e.g., should either of tabs 72 break) does not require replacement of the entire station, since base 20, lid 70 and latch 100 are separate and replaceable components.

It should therefore be appreciated that the preferred embodiments of the present invention provides substantial benefits in terms of tamper-resistance, weather-resistance, effectiveness, and durability in an inexpensive and easily maintained package. As additional modifications will be apparent to those skilled in the art; however, the invention therefore lies in the claims hereinafter appended.

What is claimed is:

1. A rodent bait station comprising:
    (a) an enclosure having at least one opening defined in an exterior wall thereof;
    (b) a bait receptacle disposed within the enclosure and defined by at least one interior wall of the enclosure, the bait receptacle having a support surface that supports bait; and
    (c) an inclined passageway defined by a ramp and at least one wall of the enclosure wherein the support surface of the bait receptacle is elevated relative to the opening in the enclosure and wherein the exterior wall is curved, and wherein the inclined passageway leads from the opening to the bait receptacle along the curved exterior wall.

2. The rodent bait station of claim 1, further comprising a second inclined passageway defined by a ramp and leading along a curved wall of the enclosure from a second opening defined in an opposite exterior wall of the enclosure to the bait receptacle, wherein the first and second inclined passageways curve around the bait receptacle and meet proximate a common entrance to the bait receptacle.

3. The rodent bait station of claim 2, further comprising a return, disposed in the enclosure proximate where the first and second inclined passageways meet, the return including first and second walls respectively facing the first and second inclined passageways and curving toward the common entrance to the bait receptacle; whereby the return directs rodents toward the common entrance to the bait receptacle.

4. The rodent bait station of claim 2, wherein the enclosure is "D" shaped with an exterior wall formed from a straight portion and a curved portion, with the first and second openings defined proximate intersections between the straight and curved portions.

5. The rodent bait station of claim 1, further comprising a return, disposed in the enclosure proximate the bait receptacle, the return including a wall facing the inclined passageway and curving toward an entrance to the bait receptacle; whereby the return directs rodents toward the entrance to the bait receptacle.

6. The rodent bait station of claim 1, wherein the bait receptacle comprises a removable tray defining the support surface and supporting the bait, the tray including at least one handle.

7. The rodent bait station of claim 1, wherein the inclined passageway terminates at a bottom elevation of the opening in the enclosure such that a lip is not formed by the opening; whereby moisture is not trapped in the passage proximate the opening.

8. The rodent bait station of claim 1, wherein the enclosure includes a base and a lid secured to one another with a latch.

9. The rodent bait station of claim 8, wherein the base and lid are separate components, at least one of the base and lid including tabs received by the other of the base and lid when the lid is secured to the base.

10. The rodent bait station of claim 8, wherein the latch comprises an alignment member and a engagement member secured to the lid, the engagement member including a catch, and wherein the base includes first and second apertures which respectively receive the alignment and engagement members of the latch.

11. The rodent bait station of claim 10, wherein the catch faces the alignment member, wherein the engagement member is deformable from an engaged position to an unengaged position, wherein in the engaged position, the catch on the engagement member restricts movement of the engagement member through the second aperture, and in the unengaged position, the catch on the engagement member permits movement of the engagement member through the second aperture, and wherein the rodent bait station further comprises a key, insertable through a key aperture in the lid, the key including a wedge member which wedges between the alignment and engagement members to deform the engagement member to the unengaged position.

12. The rodent bait station of claim 11, wherein the latch further comprises a second engagement member disposed opposite the first engagement member and having a catch facing the alignment member, wherein the base includes a third aperture for receiving the second engagement member, and wherein the key includes a second wedge member which wedges between the alignment member and the second engagement member to deform the second engagement member to an unengaged position.

13. A rodent bait station comprising:
    (a) an enclosure;
    (b) a bait receptacle disposed within a rodent accessible area of the enclosure for housing bait; and
    (c) an interior receptacle disposed within the enclosure wherein the interior receptacle is accessible to the human user and the interior receptacle is isolated from the rodent accessible area of the enclosure.

14. The rodent bait station of claim 13, wherein the enclosure comprises a base and a lid coupled thereto for restricting access to the interior of the enclosure, wherein the lid restricts access to the interior receptacle.

15. The rodent bait station of claim 13, wherein the interior receptacle stores a maintenance record for the rodent bait station.

16. A rodent bait station, comprising:
    (a) a base;
    (b) a lid; and
    (c) a latch for securing the lid to the base, the latch including an alignment member and a engagement member secured to one of the lid and the base, the engagement member including a catch, wherein the other of the lid and the base includes first and second apertures which respectively receive the alignment and engagement members of the latch, wherein the catch faces the alignment member, wherein the engagement member is deformable from an engaged position to an unengaged position, wherein in the engaged position, the catch on the engagement member restricts movement of the engagement member through the second aperture, and in the unengaged position, the catch on the engagement member permits movement of the engagement member through the second aperture.

17. The rodent bait station of claim 16, further comprising a key, insertable through a key aperture in one of the lid and the base, the key including a wedge member which wedges between the alignment and engagement members to deform the engagement member to the unengaged position.

18. The rodent bait station of claim 17, wherein the latch further comprises a second engagement member disposed opposite the first engagement member and having a catch facing the alignment member, wherein the other of the lid and the base includes a third aperture for receiving the second engagement member, and wherein the key includes a second wedge member which wedges between the alignment member and the second engagement member to deform the second engagement member to an unengaged position.

19. The rodent bait station of claim 16, wherein the latch is removably secured to the lid and the first and second apertures are disposed in the base; whereby the latch is replaceable.

20. A rodent bait station comprising:
   (a) an enclosure comprising at least a first piece and a second piece wherein the second piece can be moved relative to the first piece resulting in at least a first closed orientation and a second open orientation of the enclosure;
   (b) a bait receptacle disposed within a rodent accessible area of the enclosure for housing bait; and
   (c) an interior receptacle disposed within the enclosure, the interior receptacle formed in part by the first piece and in part by the second piece such that when the first piece and the second piece are in the first closed orientation, the interior receptacle is isolated from the rodent accessible area of the enclosure and wherein when the first and second pieces are in the second open orientation the interior receptacle is accessible from outside the enclosure.

21. The rodent bait station of claim 20 wherein the first piece of the enclosure is a base and the second piece of the enclosure is a lid.

22. A rodent bait station comprising:
   (a) an enclosure having at least one opening defined in an exterior wall thereof wherein the enclosure includes a base and a lid secured to one another with a latch wherein the base includes an internal receptacle for retaining printed materials, the internal receptacle being enclosed within the base by the lid and isolated from the bait receptacle and inclined passageway;
   (b) a bait receptacle disposed within the enclosure and defined by at least one interior wall of the enclosure, the bait receptacle having a support surface that supports bait; and
   (c) an inclined passageway defined by a ramp and at least one wall of the enclosure.

23. A rodent bait station comprising:
   (a) an enclosure having at least one opening defined in an exterior wall thereof wherein the enclosure includes a base and a lid secured to one another with a latch wherein the latch is removably secured to the lid whereby the latch is replaceable;
   (b) a bait receptacle disposed within the enclosure and defined by at least one interior wall of the enclosure, the bait receptacle having a support surface that supports bait; and
   (c) an inclined passageway defined by a ramp and at least one wall of the enclosure.

* * * * *